United States Patent
Li et al.

(10) Patent No.: US 9,337,989 B2
(45) Date of Patent: May 10, 2016

(54) METHOD FOR CONFIGURING TRANSMISSION RESOURCE, RELATED DEVICE, AND COMMUNICATION SYSTEM

(71) Applicant: Huawei Technologies Co., Ltd., Shenzhen, Guangdong (CN)

(72) Inventors: Yang Li, Beijing (CN); Chaojun Li, Beijing (CN); Xiaobo Chen, Beijing (CN); Xiaoan Fan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 14/230,919

(22) Filed: Mar. 31, 2014

(65) Prior Publication Data

US 2014/0247758 A1    Sep. 4, 2014

Related U.S. Application Data

(63) Continuation of application No. PCT/CN2012/082532, filed on Oct. 8, 2012.

(30) Foreign Application Priority Data

Sep. 30, 2011 (CN) .......................... 2011 1 0304418

(51) Int. Cl.
*H04J 3/00* (2006.01)
*H04L 5/00* (2006.01)
(Continued)

(52) U.S. Cl.
CPC ............. *H04L 5/0096* (2013.01); *H04B 7/265* (2013.01); *H04L 5/14* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 2008/0137562 | A1 | 6/2008 | Li et al. |
| 2009/0249153 | A1 | 10/2009 | Zhang |

(Continued)

FOREIGN PATENT DOCUMENTS

| CN | 101835162 A | 9/2009 |
| CN | 101926214 A | 12/2010 |

(Continued)

OTHER PUBLICATIONS $3^{rd}$ Generation Partnership Project; Technical Specification Group Access Network; Evolved Universal Terrestrial Radio Access (E-UTRA); Radio Resource Control (RRC); Protocol specification (Release 10), 3GPP TS 36.331, vol. 10.3.0, $3^{rd}$ Generation Partnership Project, Valbonne, France (Sep. 2011).

*Primary Examiner* — Afshawn Towfighi
(74) *Attorney, Agent, or Firm* — Leydig, Voit & Mayer, Ltd.

(57) ABSTRACT

Embodiments of the present disclosure related to a method for configuring a transmission resource, a related device, and a communication system. The method for configuring a transmission resource includes: notifying, by an access device, a user equipment of an uplink-downlink configuration change period, where the uplink-downlink configuration change period is less than a system message change period; and sending, by the access device, a first message to the user equipment, where the first message carries an uplink-downlink configuration indication corresponding to the uplink-downlink configuration change period, so that the user equipment updates, according to the uplink-downlink configuration indication, an uplink-downlink configuration used by the user equipment. The solutions according to the embodiments of the present disclosure help to improve flexibility for configuring a transmission resource and a utilization rate of a frequency spectrum resource.

14 Claims, 2 Drawing Sheets

(51) Int. Cl.
  *H04W 72/04* (2009.01)
  *H04B 7/26* (2006.01)
  *H04L 5/14* (2006.01)

(56) References Cited

U.S. PATENT DOCUMENTS

2011/0105136 A1* 5/2011 Choi .................. H04W 48/08
                                                455/452.1
2013/0336177 A1* 12/2013 Gao .................. H04W 72/0446
                                                370/280

FOREIGN PATENT DOCUMENTS

| CN | 102045141 A | 5/2011 |
| CN | 102131295 A | 7/2011 |
| WO | WO 2010110598 A2 | 9/2010 |
| WO | WO 2012113131 A1 | 8/2012 |

* cited by examiner

METHOD FOR CONFIGURING TRANSMISSION RESOURCE, RELATED DEVICE, AND COMMUNICATION SYSTEM

CROSS-REFERENCE TO RELATED APPLICATIONS

This application is a continuation of International Patent Application No. PCT/CN2012/082532, filed on Oct. 8, 2012, which claims priority to Chinese Patent Application No. 201110304418.8, filed on Sep. 30, 2011, both of which are hereby incorporated by reference in their entireties.

TECHNICAL FIELD

The present disclosure relates to the field of communication technologies and, in particular, to a method for configuring a transmission resource, a related device, and a communication system.

BACKGROUND

A communication system, such as a Long Term Evolution (LTE, Long Term Evolution) system, can support a time division duplexing (TDD, Time Division Duplexing) scheme. That is to say, an uplink (UL, Uplink) and a downlink (DL, Downlink) may use different timeslots of a same frequency. An LTE TDD system may configure an uplink-downlink configuration (Uplink-Downlink Configuration) in a semi-static manner according to a service type, so as to satisfy a requirement of different uplink-downlink asymmetrical services.

Currently, the LTE TDD system defines a total of seven uplink-downlink configurations. Referring to Table 1, "D" denotes a downlink subframe, "U" denotes an uplink subframe, and "S" denotes a special subframe. As can be seen from Table 1, time-domain resources reserved for a downlink service in uplink-downlink configuration manners account for 40% to 90%. In the LTE TDD system, an uplink-downlink configuration in use is configured in a semi-static manner, where uplink-downlink configuration indication information is carried in a system information block 1 (SIB1, System Information Block-1) of a system broadcast message. The SIB1 has a transmission period of 80 ms (milliseconds), and is repeated every 20 ms within each transmission period thereof, so as to ensure correct reception for all users in a cell.

TABLE 1

| Uplink-downlink configuration. | Downlink-to-Uplink Switch-point periodicity | Subframe number (Subframe number) | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Because an existing SIB1 normally changes slowly, in order to avoid energy consumption caused by a UE reading the same SIB1 repeatedly, the system further defines a message change period of the SIB1. Information in the SIB1 is changed and sent to a UE only at a start moment of one change period, and the information in the SIB1 remains unchanged within one change period. A UE in a connected state needs to update the SIB1 only at a start moment of a change period. Regarding a UE in an idle state, if a change occurs on an SIB1, an existing base station notifies the UE in the idle state by paging, and the UE in the idle state wakes up and receives a new SIB1 at a start moment of a next change period. The SIB1 has a minimum change period of 640 ms and a maximum one of about 41 s (seconds).

In order to avoid uplink-downlink interference between cells, in a conventional TDD system, normally multiple cells within a large range all use a same uplink-downlink configuration which remains unchanged for a long time. A change in the uplink-downlink configuration, if necessary, is made to the multiple cells together, and a hard handover is performed by interrupting data transmission. However, in an isolated cell or a cell covered by a low-power node, an interference impact between cells is insignificant, and in cases where the cell serves a small number of users, a condition of an uplink-downlink service burst occurs obviously. A technical problem worth studying in such scenarios is how to use a frequency spectrum resource more efficiently to take specific advantages of a TDD system.

SUMMARY

Embodiments of the present disclosure provide a method for configuring a transmission resource, a related device, and a communication system, so as to improve flexibility for configuring a transmission resource and a utilization rate of a frequency spectrum resource.

In order to solve the foregoing technical problem, the embodiments of the present disclosure provide the following technical solutions:

A method for configuring a transmission resource includes:

notifying, by an access device, a user equipment of an uplink-downlink configuration change period, where the second uplink-downlink configuration change period is less than a system message change period; and sending, by the access device, a first message to the user equipment, where the first message carries an uplink-downlink configuration indication corresponding to the second uplink-downlink configuration change period, so that the user equipment updates, according to the uplink-downlink configuration indication, an uplink-downlink configuration used by the user equipment.

A method for configuring a transmission resource includes:

obtaining, by a user equipment, an uplink-downlink configuration change period based on a notification received from an access device, where the uplink-downlink configuration change period is less than a system message change period;

receiving, by the user equipment, a first message from the access device, where the first message carries an uplink-downlink configuration indication corresponding to the uplink-downlink configuration change period; and updating, by the user equipment and according to the uplink-downlink configuration indication carried in the first message, an uplink-downlink configuration used by the user equipment.

An access device includes:

a notifying module, configured to notify a user equipment of an uplink-downlink configuration change period, where the uplink-downlink configuration change period is less than a system message change period; and a configuring module, configured to send a first message to the user equipment, where the first message carries an uplink-downlink configuration indication corresponding to the uplink-downlink configuration change period notified by the notifying module, so that the user equipment updates, according to the uplink-downlink configuration indication, an uplink-downlink configuration used by the user equipment.

A user equipment includes:

an obtaining module, configured to obtain an uplink-downlink configuration change period by using a notification of an access device, where the uplink-downlink configuration change period is less than a system message change period;

a receiving module, configured to receive a first message from the access device, where the first message carries an uplink-downlink configuration indication corresponding to the uplink-downlink configuration change period; and a configuration updating module, configured to update, according to the uplink-downlink configuration indication carried in the first message, an uplink-downlink configuration used by the user equipment.

A communication system includes:

the access device and the user equipment described in foregoing embodiments.

As can be seen from above, an access device according to the embodiment of the present disclosure sets an uplink-downlink configuration change period that is shorter than a system message change period; the access device notifies a user equipment of the uplink-downlink configuration change period, and sends a message carrying an uplink-downlink configuration indication corresponding to the second uplink-downlink configuration change period to the user equipment when a change occurs on an uplink-downlink configuration corresponding to the second uplink-downlink configuration change period. The uplink-downlink configuration change period is shorter, thereby improving flexibility for configuring a transmission resource and a utilization rate of a frequency spectrum resource, so as to suit, in a better way, a scenario where an uplink-downlink service volume fluctuates greatly, and obtain better service adaptability.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
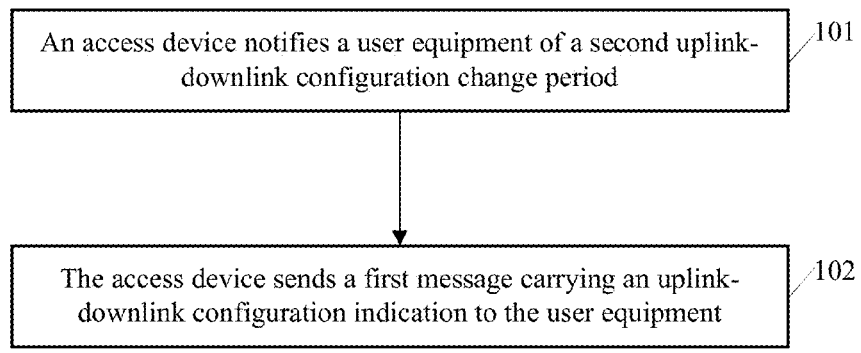
FIG. 1 is a schematic flowchart of a method for configuring a transmission resource according to an embodiment of the present disclosure.

Embodiments of the present disclosure provide a method for configuring a transmission resource, a related device, and a communication system, so as to improve flexibility for configuring a transmission resource and a utilization rate of a frequency spectrum resource.

Detailed descriptions are provided as follows respectively.

To make the objectives, features, and advantages of the present disclosure more comprehensible, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An access device referred to in the embodiments of the present disclosure is an access network entity that is capable of implementing a function of radio access management for a UE, where the access device may have a different name, position, and product form in a different network.

For example, an access device mentioned in the following embodiments of the present disclosure may, for example, refer to: an evolved base station (eNodeB), a home base station (HeNB), or a base station of another type in an Evolved-Universal Mobile Telecommunications System (UMTS, Universal Mobile Telecommunications System) terrestrial radio access network (E-UTRAN, Evolved UMTS Terrestrial Radio Access Network); a base station controller or a radio network controller (RNC, Radio Network Controller) in UMTS terrestrial radio access network (UTRAN, UMTS Territorial Radio Access Network)/GSM EDGE radio access network (GERAN, GSM EDGE Radio Access Network); an entity having an access network logical function of a high rate packet data access network (HRPD-AN, High Rate Packet Data Access Network) in a Code Division Multiple Access (CDMA, Code Division Multiple Access) network; an entity having an access network logical function of an evolved packet data gateway (EPDG, Evolved Packet Data Gateway) in a wireless local area network (WLAN, Wireless Local Area network); an access service network base station (ASN-BS, Access Service Network Base Station) in a Worldwide Interoperability for Microwave Access (WiMAX, Worldwide Interoperability for Microwave Access) network; or an entity implementing a function of radio access management for a terminal in another network.

An embodiment of a method for configuring a transmission resource of the present disclosure may include: notifying, by an access device, a UE of a second uplink-downlink configuration change period, where the second uplink-downlink configuration change period is less than a system message change period; and sending a first message to the user equipment, where the first message carries an uplink-downlink configuration indication corresponding to the second uplink-downlink configuration change period.

As shown in FIG. 1, following specific steps may include:

Step 101. An access device notifies a user equipment of a second uplink-downlink configuration change period.

The second uplink-downlink configuration change period (which may be referred to as $T_{UD}$ for short hereinafter) is less than a system message change period (that is, less than a change period of an SIB1), where the second uplink-downlink configuration change period $T_{UD}$ may be, for example, 1/N of the system message change period, where N is a positive integer. A value of N may be, for example, 2, 3, 4, 8, or another value.

In an actual application, for example, in an isolated cell or a cell covered by a low-power node, an interference impact between cells is insignificant, and in cases where the cell serves a small number of users, a condition of an uplink-downlink service burst occurs obviously. In a scenario where the condition of the uplink-downlink service burst occurs obviously, the access device may define a second uplink-downlink configuration change period $T_{UD}$ that is shorter than the system message change period (the change period of the SIB1, which may be referred to as $T_{SIB1}$ for short hereinafter). Currently, the system message change period $T_{SIB1}$ has a minimum value of 640 ms and a maximum value of about 41 s. The second uplink-downlink configuration change period $T_{UD}$ defined by the access device may be, for example, 320 ms, 160 ms, 80 ms, 40 ms, or another value.

Within duration of one second uplink-downlink configuration change period $T_{UD}$, an uplink-downlink configuration corresponding to a cell remains unchanged, and the uplink-downlink configuration may change at a start point of each second uplink-downlink configuration change period $T_{UD}$. The second uplink-downlink configuration change period $T_{UD}$ is configurable by a system. The access device may, for example, select a second uplink-downlink configuration change period $T_{UD}$ of a proper size according to a current change condition of an uplink-downlink service volume. For example, regarding a greater deviation in an uplink-downlink service volume configuration between two adjacent time segments (where the time segment is, for example, 40 ms, 80 ms, 160 ms, is (1 second), or another time length), the access device sets a shorter second uplink-downlink configuration change period $T_{UD}$ (for example, a different deviation range of the uplink-downlink service volume configuration may correspond to a second uplink-downlink configuration change period $T_{UD}$ of a different size). Alternatively, for example, if a cell has a small number (for example, 1 to 5 users) of activated users currently, in such cases, a condition of an uplink-downlink service burst or fluctuation may occur frequently in the cell; therefore, the access device may use a small second uplink-downlink configuration change period $T_{UD}$. If the cell has many activated users (>10 users) currently, in such cases, a total service volume of multiple users may fluctuate relatively slow; therefore, the access device may use a great second uplink-downlink configuration change $T_{UD}$. That is to say, a different number range of activated users in a cell may correspond to a different second uplink-downlink configuration change period $T_{UD}$.

In an actual application, the access device may, for example, notify the UE of the currently configured second uplink-downlink configuration change period $T_{UD}$ by using higher layer signaling (or a system broadcast message).

Further, the access device may also select an uplink-downlink configuration change manner according to requirements. For example, if a service of a current cell fluctuates relatively slowly (for example, service fluctuation is less than a set threshold S1), the access device may select the system message change period $T_{SIB1}$ as an uplink-downlink configuration change period of the cell (that is, may select to change the uplink-downlink configuration at a start moment of each system message change period $T_{SIB1}$). If the current service of the cell fluctuates relatively quickly (for example, service fluctuation is greater than a set threshold S2), the access device may use a manner of dynamically changing the uplink-downlink configuration (that is, configuring some flexible subframes (flexible subframe), and the access device may dynamically configure each flexible subframe as an uplink subframe or a downlink subframe). If the current service of the cell fluctuates as normally (for example, fluctuation is between the threshold S1 and the threshold S2), the access device may select the second uplink-downlink configuration change period $T_{UD}$ that is less than the system message change period $T_{SIB1}$ as the uplink-downlink configuration change period of the cell (that is, may select to change the uplink-downlink configuration at a start moment of each second uplink-downlink configuration change period $T_{UD}$). For example, the access device may add an information bit to a system broadcast message to indicate the selected uplink-downlink configuration change manner; or the access device may add an information bit to dedicated radio resource control (RRC, radio resource control) signaling to indicate the selected uplink-downlink configuration change manner, so as to improve configuration flexibility. This can implement configuration specific to a user.

Step 102. The access device sends a first message carrying an uplink-downlink configuration indication corresponding to the second uplink-downlink configuration change period to the UE, so that the UE updates, according to the uplink-downlink configuration indication, an uplink-downlink configuration used by the UE.

The access device may, for example, send the first message to the UE at a start moment of a second uplink-downlink configuration change period, where an uplink-downlink configuration indicated (changed) by an uplink-downlink configuration indication carried in the first message sent at the start moment of the second uplink-downlink configuration change period is enabled within the second uplink-downlink configuration change period; or the access device may send the first message to the UE at a non-start moment of a second uplink-downlink configuration change period, where an uplink-downlink configuration indicated changed by the uplink-downlink configuration indication carried in the first message sent at the non-start moment of the second uplink-downlink configuration change period is enabled within a second uplink-downlink configuration change period following the second uplink-downlink configuration change period.

In an actual application, the access device may, for example, add an uplink-downlink configuration indication corresponding to the second uplink-downlink configuration change period $T_{UD}$ to a system broadcast message (that is, the first message is the system broadcast message), so as to notify the UE of the uplink-downlink configuration corresponding to the current second uplink-downlink configuration change period $T_{UD}$ by using the system broadcast message; or the access device may carry an uplink-downlink configuration indication corresponding to the second uplink-downlink configuration change period $T_{UD}$ in dedicated RRC signaling, so as to notify the UE (for example, notify a UE in an activated state and supporting the second uplink-downlink configuration change period $T_{UD}$) of the uplink-downlink configuration corresponding to the current second uplink-downlink configuration change period $T_{UD}$ by using the dedicated RRC signaling (that is, the first message is the dedicated RRC signaling). Definitely, the access device may also carry the uplink-downlink configuration indication corresponding to the second uplink-downlink configuration change period $T_{UD}$ in a message of another type to send to the UE.

Figure 2:
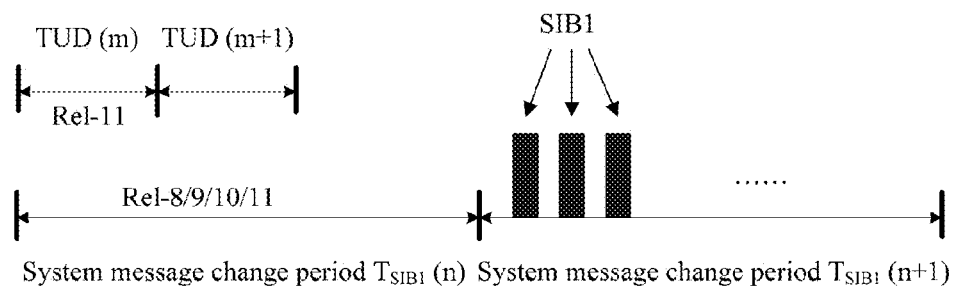
FIG. 2 is a schematic application diagram of a system message change period and a second uplink-downlink configuration change period according to an embodiment of the present disclosure.

In addition, considering a compatibility problem of an LTE TDD system, a UE (if the second uplink-downlink configuration change period $T_{UD}$ is not supported by the UE) according to Rel-8/9/10 (i.e., 3GPP Release 8, 9, or 10) may still use uplink-downlink configuration indication information carried in an SIB1 to indicate the uplink-downlink configuration, and may update, according to the system message change period $T_{SIB1}$, the uplink-downlink configuration used by the UE, where the configuration is assumed to be "uplink-downlink configuration-1". A UE according to Rel-11 (i.e., 3GPP Release 11) or a UE according to a higher version in a connected state (if the second uplink-downlink configuration change period $T_{UD}$ is supported by the UE) may update, according to the set second uplink-downlink configuration change period $T_{UD}$, the uplink-downlink configuration used by the UE, where the uplink-downlink configuration is assumed to be "uplink-downlink configuration-2". For example, as shown in FIG. 2, at a same moment, the uplink-downlink configuration-1 and the uplink-downlink configuration-2 may be different. Because a change period $T_{UD}$ of the uplink-downlink configuration-2 is less than a change period $T_{SIB1}$ of the uplink-downlink configuration-1, the use of the uplink-downlink configuration-2 helps to suit, in a better way, a scenario where an uplink-downlink service change quickly. In addition, because the uplink-downlink configuration-1 can represent a condition of an average uplink-downlink service volume within a period of time, if a change occurs on the uplink-downlink configuration-1 at a system message change moment, the UE according to Rel-11 in the connected state may preferably use an updated uplink-downlink configuration-1. A UE according to Rel-11 in an idle state does not need to send and receive data; therefore, it may use the uplink-downlink configuration-1 and track a change in the uplink-downlink configuration-1. In such cases, only a UE in the connected state and supporting a flexible subframe configuration needs to update more quickly an uplink-downlink configuration used by the UE, and the UE according to Rel-11 in the idle state does not need to update, according to the second uplink-downlink configuration change period $T_{UD}$, the uplink-downlink configuration used by the UE; therefore, system overhead caused by paging the UE in the idle state can be avoided, which also helps to ensure backward compatibility.

In an application scenario, if the first message is a system broadcast message, because the uplink-downlink configuration indication corresponding to the second uplink-downlink configuration change period $T_{UD}$ is applicable only to a UE in a connected state, when a change occurs on the uplink-downlink configuration indication corresponding to the corresponding uplink-downlink configuration change period $T_{UD}$ carried in the system broadcast message, the access device may not send paging to notify a UE in an idle state. If the first message is dedicated RRC signaling, and if a UE receives the RRC signaling (where the RRC signaling carries an uplink-downlink configuration indication of a corresponding uplink-downlink configuration change period $T_{UD}$) at a start moment of a second uplink-downlink configuration change period $T_{UD}$, the UE may enable the uplink-downlink configuration indicated by the uplink-downlink configuration indication within the uplink-downlink configuration change period $T_{UD}$. If a UE receives the RRC signaling (where the RRC signaling carries an uplink-downlink configuration indication of a corresponding uplink-downlink configuration change period $T_{UD}$) at another position of one configuration change period (that is, a non-start moment), the UE may enable the uplink-downlink configuration indicated by the uplink-downlink configuration indication within an uplink-downlink configuration change period $T_{UD}$ following the uplink-downlink configuration change period $T_{UD}$. The access device may, by using the dedicated RRC signaling, configure a different uplink-downlink configuration for a different UE, so as to perform uplink-downlink interference management in a better way, and further improve flexibility.

In an actual application, the uplink-downlink configuration indication corresponding to the second uplink-downlink configuration change period $T_{UD}$ may be any information that can indicate a corresponding uplink-downlink configuration. For example, the uplink-downlink configuration indication corresponding to the second uplink-downlink configuration change period $T_{UD}$ may indicate a corresponding uplink-downlink configuration number in Table 1 (where a different configuration number in Table 1 corresponds to a different uplink-downlink configuration); or the uplink-downlink configuration indication corresponding to the second uplink-downlink configuration change period $T_{UD}$ may also indicate a relative deviation value, where the relative deviation value is a deviation value between an uplink-downlink configuration number in Table 1 corresponding to the uplink-downlink configuration corresponding to the second uplink-downlink configuration change period $T_{UD}$ and an uplink-downlink configuration number in Table 1 corresponding to the uplink-downlink configuration corresponding to the system message change period $T_{SIB1}$. For example, an uplink-downlink configuration number in Table 1 of the uplink-downlink configuration corresponding to the second uplink-downlink configuration change period $T_{UD}$ is 1, and an uplink-downlink configuration number in Table 1 corresponding to the uplink-downlink configuration corresponding to the system message change period $T_{SIB1}$ is 3; therefore, the uplink-downlink configuration indication corresponding to the second uplink-downlink configuration change period $T_{UD}$ may indicate that a relative deviation value is −2. The UE may learn, by using an SIB1, the uplink-downlink configuration number in Table 1 corresponding to the uplink-downlink configuration corresponding to the system message change period $T_{SIB1}$; and after receiving a message carrying the uplink-downlink configuration indication (with the deviation value −2) corresponding to the second uplink-downlink configuration change period $T_{UD}$, may add the deviation value (−2) to the uplink-downlink configuration number (3) in Table 1 corresponding to the uplink-downlink configuration corresponding to the system message change period $T_{SIB1}$, thereby learning an uplink-downlink configuration (uplink-downlink configuration number 1) corresponding to the current second uplink-downlink configuration change period $T_{UD}$.

The access device may also indicate the uplink-downlink configuration corresponding to the second uplink-downlink configuration change period $T_{UD}$ in multiple other manners, and an uplink-downlink configuration indicated by the uplink-downlink configuration indication may be the same as or different from an uplink-downlink configuration corresponding to a previous second uplink-downlink configuration change period.

An embodiment of the present disclosure further provides a method for configuring a transmission resource, which may include:

obtaining, by a UE, a second uplink-downlink configuration change period by using a notification of an access device, where the second uplink-downlink configuration change period is less than a system message change period; receiving, by the UE, a first message from the access device, where the first message carries an uplink-downlink configuration indication corresponding to the second uplink-downlink configuration change period; and updating, by the UE according to the uplink-downlink configuration indication carried in the first message, an uplink-downlink configuration used by the UE.

In an actual application, if the UE receives the first message from the access device at a start moment of the second uplink-downlink configuration change period, an uplink-downlink configuration indicated by the uplink-downlink configuration indication carried in the first message may be enabled within the second uplink-downlink configuration change period; or if the UE receives the first message from the access device at a non-start moment of the second uplink-downlink configuration change period, an uplink-downlink configuration indicated by the uplink-downlink configuration indication may be, for example, enabled within a second uplink-downlink configuration change period following the second uplink-downlink configuration change period.

In an application scenario, after the UE updates, according to the uplink-downlink configuration indication carried in the first message, the uplink-downlink configuration used by the UE, if the UE receives a system message from the access device, where the system message carries an uplink-downlink configuration indication corresponding to a system message change period, the UE may also update, for example, according to the uplink-downlink configuration indication carried in the system message, the uplink-downlink configuration used by the UE, or the UE may directly ignore the uplink-downlink configuration indication carried in the system message and corresponding to the system message change period.

In an application scenario, if the UE is a UE (for example, a UE according to Rel-11 or a UE according to a higher version) in a connected state and supporting the second uplink-downlink configuration change period $T_{UD}$, it may update, according to the second uplink-downlink configuration change period $T_{UD}$ and the uplink-downlink configuration indication carried in the first message, the uplink-downlink configuration used by the UE. If the UE is a UE (for example, a UE according to Rel-11 or a UE according to a higher version) in an idle state and capable of supporting the second uplink-downlink configuration change period, it may update, according to the system message change period $T_{SIB1}$ and the uplink-downlink configuration corresponding to the system message change period $T_{SIB1}$, the uplink-downlink configuration used by the UE. If the UE is a UE (for example, a UE according to Rel-8/9/10, or the like) that does not support the second uplink-downlink configuration change period, it may update, according to the system message change period $T_{SIB1}$ and the uplink-downlink configuration corresponding to the system message change period $T_{SIB1}$, the uplink-downlink configuration used by the UE.

As can be seen from above, an access device according to the embodiment sets a second uplink-downlink configuration change period which is shorter than a system message change period; the access device notifies a UE of the second uplink-downlink configuration change period, and may send a message carrying an uplink-downlink configuration indication corresponding to the second uplink-downlink configuration change period to the UE when a change occurs on an uplink-downlink configuration corresponding to the second uplink-downlink configuration change period (or at another moment). The uplink-downlink configuration change period is designed to be shorter, thereby improving flexibility for configuring a transmission resource and a utilization rate of a frequency spectrum resource, so as to suit, in a better way, a scenario where an uplink-downlink service volume fluctuates greatly, and obtain better service adaptability.

In addition, if the second uplink-downlink configuration change period $T_{UD}$ is 1/N of the system message change period, where N is a positive integer, the access device may jointly carry the uplink-downlink configuration indication corresponding to the second uplink-downlink configuration change period by using a system broadcast message carrying an SIB1, which can further reduce signaling overhead and ensure backward compatibility in a better way.

In order to better understand and implement the solution according to the embodiment of the present disclosure, the following further provides a related device for implementing the method described above.

Figure 3:
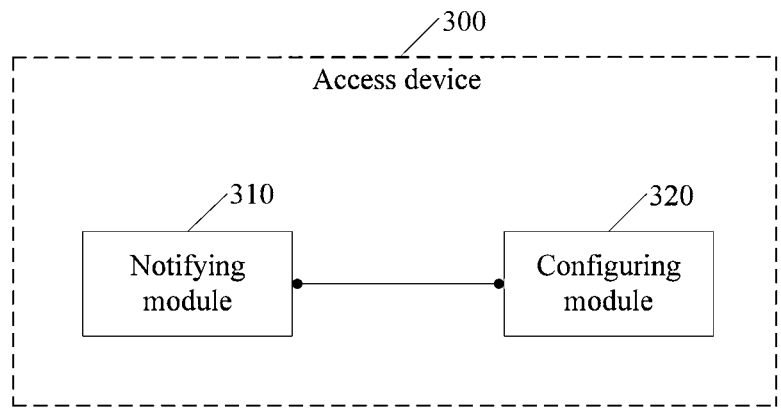
FIG. 3 is a schematic diagram of an access device according to an embodiment of the present disclosure.

Referring to FIG. 3, an access device 300 provided by an embodiment of the present disclosure may include a notifying module 310 and a configuring module 320.

The notifying module 310 is configured to notify a UE of a second uplink-downlink configuration change period, where the second uplink-downlink configuration change period is less than a system message change period.

The second uplink-downlink configuration change period ($T_{UD}$) is less than the system message change period (that is, less than a change period $T_{SIB1}$ of an SIB1), where the second uplink-downlink configuration change period $T_{UD}$ may be, for example, 1/N of the system message change period, where N is a positive integer. A value of N may be, for example, 2, 3, 4, 8, or another value.

In an actual application, for example, in an isolated cell or a cell covered by a low-power node, an interference impact between cells is insignificant, and in cases where the cell serves a small number of users, a condition of an uplink-downlink service burst occurs obviously. In a scenario where the condition of the uplink-downlink service burst occurs obviously, the access device 300 may define a second uplink-downlink configuration change period $T_{UD}$ that is shorter than the system message change period ($T_{SIB1}$). Currently, the system message change period $T_{SIB1}$ has a minimum value of 640 ms and a maximum value of about 41 s. The second uplink-downlink configuration change period $T_{UD}$ defined by the access device 300 may be, for example, 320 ms, 160 ms, 80 ms, 40 ms, or another value.

Within duration of one second uplink-downlink configuration change period $T_{UD}$, an uplink-downlink configuration corresponding to a cell remains unchanged, and the uplink-downlink configuration may change at a start point of each second uplink-downlink configuration change period $T_{UD}$. The second uplink-downlink configuration change period $T_{UD}$ is configurable by a system. The access device 300 may, for example, select a second downlink configuration change period $T_{UD}$ of a proper size according to a current change condition of an uplink-downlink service volume. For example, regarding a greater deviation in an uplink-downlink service volume configuration between two adjacent time segments (where the time segment is, for example, 40 ms, 80 ms, 160 ms, 1 s, or another time length), the access device 300 sets a shorter second uplink-downlink configuration change period $T_{UD}$ (for example, a different deviation range of the uplink-downlink service volume configuration may correspond to a second uplink-downlink configuration change period $T_{UD}$ of a different size). Alternatively, for example, if a cell has a small number of activated users currently (for example, 1 to 5 users), in such cases, an uplink-downlink service burst or fluctuation may occur frequently in the cell; therefore, the access device may use a small second uplink-downlink configuration change $T_{UD}$. If the cell has many activated users (>10 users) currently, in such cases, a total service volume of multiple users may fluctuate relatively slow; therefore, the access device 300 may use a great second uplink-downlink configuration change $T_{UD}$. That is to say, a different number range of activated users in a cell may correspond to a different second uplink-downlink configuration change period $T_{UD}$.

In an application scenario, the notifying module 310 may be configured to notify the UE of the second uplink-downlink configuration change period by using a system broadcast message or dedicated radio resource control signaling, where the second uplink-downlink configuration change period is less than the system message change period.

Further, the access device 300 may also select an uplink-downlink configuration change manner according to requirements. For example, if a current service of a cell fluctuates relatively slow (for example, service fluctuation is less than a set threshold S1), the access device 300 may select the system message change period $T_{SIB1}$ as an uplink-downlink configuration change period of the cell (that is, may select to change the uplink-downlink configuration at a start moment of each system message change period $T_{SIB1}$). If the current service of the cell fluctuates relatively fast (for example, service fluctuation is greater than a set threshold S2), the access device 300 may use a manner of dynamically changing the uplink-downlink configuration (that is, configuring some flexible subframes (flexible subframe), and the access device may dynamically configure each flexible subframe as an uplink subframe or a downlink subframe). If the current service of the cell fluctuates as normal (for example, fluctuation is between the threshold S1 and the threshold S2), the access device 300 may select the second uplink-downlink configuration change period $T_{UD}$ that is less than the system message change period $T_{SIB1}$ as the uplink-downlink configuration change period of the cell (that is, may select to change the uplink-downlink configuration at a start moment of each second uplink-downlink configuration change period $T_{UD}$). For example, the access device 300 may add an information bit to a system broadcast message to indicate the selected uplink-downlink configuration change manner; or the access device may add an information bit to dedicated radio resource control (RRC) signaling to indicate the selected uplink-downlink configuration change manner, so as to improve configuration flexibility. This can implement configuration specific to a user.

The configuring module 320 is configured to send a first message to the UE, where the first message carries an uplink-downlink configuration indication corresponding to the second uplink-downlink configuration change period, so that the UE updates, according to the uplink-downlink configuration indication, an uplink-downlink configuration used by the UE.

In an application scenario, the configuring module 320 may be configured to send the first message to the UE at a start moment of the second uplink-downlink configuration change period, where an uplink-downlink configuration indicated by an uplink-downlink configuration indication carried in the first message sent at the start moment of the second uplink-downlink configuration change period may be enabled within the second uplink-downlink configuration change period; or send the first message to the UE at a non-start moment of the second uplink-downlink configuration change period, where an uplink-downlink configuration indicated and changed by the uplink-downlink configuration indication carried in the first message sent at the non-start moment of the second uplink-downlink configuration change period may be enabled within a second uplink-downlink configuration change period following the second uplink-downlink configuration change period.

In an actual application, the configuring module 320 may, for example, add an uplink-downlink configuration indication corresponding to the second uplink-downlink configuration change period $T_{UD}$ to a system broadcast message (that is, the first message is the system broadcast message), so as to notify the UE of the uplink-downlink configuration corresponding to the current second uplink-downlink configuration change period $T_{UD}$ by using the system broadcast message; or the configuring module 320 may carry an uplink-downlink configuration indication corresponding to the second uplink-downlink configuration change period $T_{UD}$ in dedicated RRC signaling, so as to notify the UE (for example, notify a UE in an activated state and supporting the second uplink-downlink configuration change period $T_{UD}$) of the uplink-downlink configuration corresponding to the current second uplink-downlink configuration change period $T_{UD}$ by using the dedicated RRC signaling (that is, the first message is the dedicated RRC signaling). Definitely, the configuring module 320 may also carry the uplink-downlink configuration indication corresponding to the second uplink-downlink configuration change period $T_{UD}$ in a message of another type to send to the UE.

In addition, considering a compatibility problem of an LTE TDD system, a UE (if the second uplink-downlink configuration change period $T_{UD}$ is not supported by the UE) according to Rel-8/9/10 may still use uplink-downlink configuration indication information carried in an SIB1 to indicate the uplink-downlink configuration, and may update, according to the system message change period $T_{SIB1}$, the uplink-downlink configuration used by the UE, where the configuration is assumed to be "uplink-downlink configuration-1". A UE according to Rel-11 or a UE according to a higher version in a connected state (if the second uplink-downlink configuration change period $T_{UD}$ is supported by the UE) may update, according to the set second uplink-downlink configuration change period $T_{UD}$, the uplink-downlink configuration used by the UE, where the uplink-downlink configuration is assumed to be "uplink-downlink configuration-2". For example, as shown in FIG. 2, at a same moment, the uplink-downlink configuration-1 and the uplink-downlink configuration-2 may be different. Because a change period $T_{UD}$ of the second uplink-downlink configuration-2 is less than a change period $T_{SIB1}$ of the uplink-downlink configuration-1, the use of the uplink-downlink configuration-2 helps to suit, in a better way, a scenario where an uplink-downlink service change quickly. In addition, because the uplink-downlink configuration-1 can represent a condition of an average uplink-downlink service volume within a period of time, if a change occurs on the uplink-downlink configuration-1 at a system message change moment, the UE according to Rel-11 in the connected state may preferably use an updated uplink-downlink configuration-1. A UE according to Rel-11 in an idle state does not need to send and receive data; therefore, it may use the uplink-downlink configuration-1 and track a change in the uplink-downlink configuration-1. In such cases, only a UE in the connected state and supporting a flexible subframe configuration needs to update more quickly an uplink-downlink configuration used by the UE, and the UE according to Rel-11 in the idle state does not need to update, according to the second uplink-downlink configuration change period $T_{UD}$, the uplink-downlink configuration used by the UE; therefore, system overhead caused by paging the UE in the idle state can be avoided, which also helps to ensure backward compatibility.

In an application scenario, if the first message is a system broadcast message, because the uplink-downlink configuration indication corresponding to the corresponding second uplink-downlink configuration change period $T_{UD}$ is applicable only to a UE in a connected state, when a change occurs on the uplink-downlink configuration indication corresponding to the corresponding uplink-downlink configuration change period $T_{UD}$ carried in the system broadcast message, the access device 300 may not send paging to notify a UE in an idle state. If the first message is dedicated RRC signaling, and if a UE receives the RRC signaling (where the RRC signaling carries an uplink-downlink configuration indication of a corresponding uplink-downlink configuration change period $T_{UD}$) at a start moment of a second uplink-downlink configuration change period $T_{UD}$, the UE may enable the uplink-downlink configuration indicated by the uplink-downlink configuration indication within the uplink-downlink configuration change period $T_{UD}$. If a UE receives the RRC signaling (where the RRC signaling carries an uplink-downlink configuration indication of a corresponding uplink-downlink configuration change period $T_{UD}$) at another position of one configuration change period (that is, a non-start moment), the UE may enable the uplink-downlink configuration indicated by the uplink-downlink configuration indication within an uplink-downlink configuration change period $T_{UD}$ following the uplink-downlink configuration change period $T_{UD}$. The access device 300 may, by using the dedicated RRC signaling, configure a different uplink-downlink configuration for a different UE, so as to perform uplink-downlink interference management in a better way, and further improve flexibility.

In an actual application, the uplink-downlink configuration indication corresponding to the second uplink-downlink configuration change period $T_{UD}$ may be any information that can indicate a corresponding uplink-downlink configuration. For example, the uplink-downlink configuration indication corresponding to the second uplink-downlink configuration change period $T_{UD}$ may indicate a corresponding uplink-downlink configuration number in Table 1 (where a different configuration number in Table 1 corresponds to a different uplink-downlink configuration); or the uplink-downlink configuration indication corresponding to the second uplink-downlink configuration change period $T_{UD}$ may also indicate a relative deviation value, where the relative deviation value is a deviation value between an uplink-downlink configuration number in Table 1 corresponding to the uplink-downlink configuration corresponding to the second uplink-downlink configuration change period $T_{UD}$ and an uplink-downlink configuration number in Table 1 corresponding to the uplink-downlink configuration corresponding to the system message change period $T_{SIB1}$. For example, an uplink-downlink configuration number in Table 1 of the uplink-downlink configuration corresponding to the second uplink-downlink configuration change period $T_{UD}$ is 1, and an uplink-downlink configuration number in Table 1 corresponding to the uplink-downlink configuration corresponding to the system message change period $T_{SIB1}$ is 3; therefore, the uplink-downlink configuration indication corresponding to the second uplink-downlink configuration change period $T_{UD}$ may indicate that a relative deviation value is −2. The UE may learn, by using an SIB1, the uplink-downlink configuration number in Table 1 corresponding to the uplink-downlink configuration corresponding to the system message change period $T_{SIB1}$; and after receiving a message carrying the uplink-downlink configuration indication (with the deviation value −2) corresponding to the second uplink-downlink configuration change period $T_{UD}$, may add the deviation value (−2) to the uplink-downlink configuration number (3) in Table 1 corresponding to the uplink-downlink configuration corresponding to the system message change period $T_{SIB1}$, thereby learning an uplink-downlink configuration (uplink-downlink configuration number 1) corresponding to the current second uplink-downlink configuration change period $T_{UD}$.

The configuring module 310 may also indicate the uplink-downlink configuration corresponding to the second uplink-downlink configuration change period $T_{UD}$ in multiple other manners, and an uplink-downlink configuration indicated by the uplink-downlink configuration indication may be the same as or different from an uplink-downlink configuration corresponding to a previous second uplink-downlink configuration change period.

The access device 300 according to the embodiment may be the access device in the method embodiment described above, where a function of functional modules thereof may be implemented according to the method in the method embodiment described above. For a specific implementation process thereof, reference may be made to the related description in the method embodiment, which is not described repeatedly herein.

As can be seen from above, an access device 300 according to the embodiment sets a second uplink-downlink configuration change period which is shorter than a system message change period; the access device notifies a UE of the second uplink-downlink configuration change period, and may send a message carrying an uplink-downlink configuration indication corresponding to the second uplink-downlink configuration change period to the UE when a change occurs on an uplink-downlink configuration corresponding to the second uplink-downlink configuration change period (or at another moment). The uplink-downlink configuration change period is designed to be shorter, thereby improving flexibility for configuring a transmission resource and a utilization rate of a frequency spectrum resource, so as to be adaptive to a scenario where an uplink-downlink service volume fluctuates greatly in a better way, and obtain better adaptive services.

Figure 4:
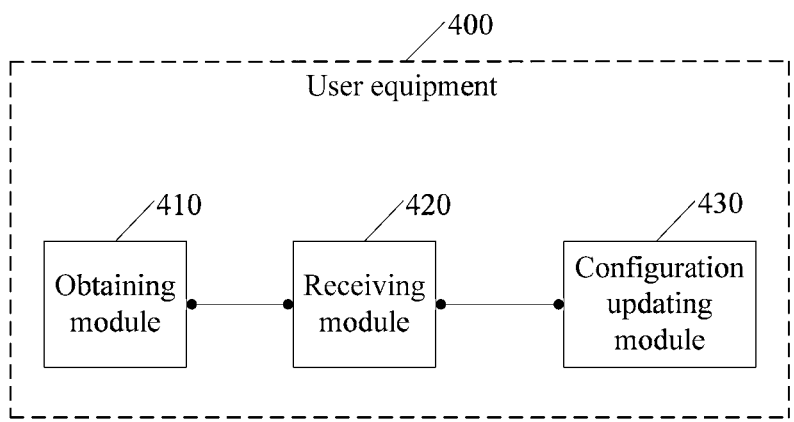
FIG. 4 is a schematic diagram of a user equipment according to an embodiment of the present disclosure.

Referring to FIG. 4, a UE 400 provided by an embodiment of the present disclosure may include an obtaining module 410, a receiving module 420, and a configuration updating module 430.

The obtaining module 410 is configured to obtain a second uplink-downlink configuration change period by using a notification of an access device, where the second uplink-downlink configuration change period is less than a system message change period.

The receiving module 420 is configured to receive a first message from the access device, where the first message carries an uplink-downlink configuration indication corresponding to the second uplink-downlink configuration change period.

The configuration updating module 430 is configured to update, according to the uplink-downlink configuration indication carried in the first message, an uplink-downlink configuration used by the UE.

In an application scenario, the receiving module 420 is configured to receive the first message from the access device at a start moment of the second uplink-downlink configuration change period, where an uplink-downlink configuration indicated by the uplink-downlink configuration indication carried in the first message is enabled within the second uplink-downlink configuration change period; or receive the first message from the access device at a non-start moment of the second uplink-downlink configuration change period, where an uplink-downlink configuration indicated by the uplink-downlink configuration indication is enabled within a second uplink-downlink configuration change period following the second uplink-downlink configuration change period.

In an application scenario, the receiving module 410 is further configured to receive a system message from the access device after the configuration updating module updates, according to the uplink-downlink configuration indication carried in the first message, the uplink-downlink configuration used by the UE, where the system message carries an uplink-downlink configuration indication corresponding to the system message change period.

The configuration updating module 430 may be further configured to update, according to the uplink-downlink configuration indication carried in the system message received by the receiving module 420, the uplink-downlink configuration used by the UE 400.

In an application scenario, if the UE is a UE (for example, a UE according to Rel-11 or a UE according to a higher version) in a connected state and capable of supporting the second uplink-downlink configuration change period $T_{UD}$, it may update, according to the second uplink-downlink configuration change period $T_{UD}$ and the uplink-downlink configuration indication carried in the first message, the uplink-downlink configuration used by the UE. If the UE is a UE (for example, a UE according to Rel-11 or a UE according to a higher version) in an idle state and supporting the second uplink-downlink configuration change period, it may update, according to the system message change period $T_{SIB1}$ and the uplink-downlink configuration corresponding to the system message change period $T_{SIB1}$, the uplink-downlink configuration used by the UE. If the UE is a UE (for example, a UE according to Rel-8/9/10, or the like) that does not support the second uplink-downlink configuration change period, it may update, according to the system message change period $T_{SIB1}$ and the uplink-downlink configuration corresponding to the system message change period $T_{SIB1}$, the uplink-downlink configuration used by the UE.

The UE 400 according to the embodiment may be the UE in the method embodiment described above, where a function of functional modules thereof may be implemented according to the method in the method embodiment described above. For a specific implementation process thereof, reference may be made to the related description in the method embodiment, which is not described repeatedly herein.

A communication system further provided by an embodiment of the present disclosure may include:
the access device 300 and/or the UE 400.

For the purpose of a brief description, the above method embodiments are described as a combination of a series of actions; however, a person skilled in the art should know that the present disclosure is not limited by the sequence of the actions described because some steps may be performed in other sequences or simultaneously according to the present disclosure. In addition, a person skilled in the art should also know that the embodiments described herein are exemplary embodiments, and the involved actions and modules are not necessarily required in the present disclosure.

In the above embodiments, the description of each of the embodiments has respective focuses, and for a part not described in detail in an embodiment, reference may be made to relevant description of other embodiments.

To sum up, an access device according to the embodiment of the present disclosure sets a second uplink-downlink configuration change period which is shorter than a system message change period; the access device notifies a UE of the second uplink-downlink configuration change period, and may send a message carrying an uplink-downlink configuration indication corresponding to the second uplink-downlink configuration change period to the UE when a change occurs on an uplink-downlink configuration corresponding to the second uplink-downlink configuration change period (or at another moment). The uplink-downlink configuration change period is designed to be shorter, thereby improving flexibility for configuring a transmission resource and a utilization rate of a frequency spectrum resource, so as to be adaptive to a scenario where an uplink-downlink service volume fluctuates greatly in a better way, and obtain better adaptive services.

In addition, if the second uplink-downlink configuration change period $T_{UD}$ is 1/N of the system message change period, where N is a positive integer, the access device may jointly carry the uplink-downlink configuration indication corresponding to the second uplink-downlink configuration change period by using a system broadcast message carrying an SIB1, which can further reduce signaling overhead and ensure backward compatibility in a better way.

A person of ordinary skill in the art may understand that all or a part of the steps of the methods in the foregoing embodiments may be implemented by a program instructing relevant hardware. The program may be stored in a computer readable storage medium. The storage medium may include: a read-only memory, a random access memory, a magnetic disk, or an optical disc.

A method for configuring a transmission resource, a related device, and a communication system according to the embodiments of the present disclosure are described in detail above. The principle and the implementation manner of the present disclosure are described by using specific examples herein. The description of the above embodiments is merely provided to help understand the method and core ideas of the present disclosure. Meanwhile, a person of ordinary skill in the art may make variations and modifications to the present disclosure in terms of specific implementation manners and application scopes according to the ideas of the present disclosure. Therefore, the content of the specification shall not be construed to limit the present disclosure.

What is claimed is:

1. A method for configuring a transmission resource, the method comprising:
   notifying, by an access device, a user equipment (UE) of an uplink-downlink configuration change period, wherein the uplink-downlink configuration change period is less than a system message change period, wherein the system message change period is a change period of a System Information Block-1 message; and
   sending, by the access device, a first message to the UE, wherein the first message carries an uplink-downlink configuration indication corresponding to the uplink-downlink configuration change period, so that the UE updates, according to the uplink-downlink configuration indication, an uplink-downlink configuration used by the UE, wherein the uplink-downlink configuration defines which one or more subframes are downlink subframes, which one or more subframes are uplink subframes, and which one or more subframes are special subframes in a time division duplex system,
   wherein the uplink-downlink configuration change period is 1/N of the system message change period, wherein N is a positive integer greater than 1.

2. The method according to claim 1, wherein the notifying, by the access device, the UE of the uplink-downlink configuration change period comprises:
   notifying, by the access device, the UE of the uplink-downlink configuration change period by using a system broadcast message; or
   notifying, by the access device, the UE of the uplink-downlink configuration change period by using dedicated radio resource control signaling.

3. The method according to claim 1, wherein the sending, by the access device, the first message to the UE comprises:
   sending, by the access device, the first message to the UE at a start of the uplink-downlink configuration change period, wherein an uplink-downlink configuration indicated by the uplink-downlink configuration indication carried in the first message is enabled within the uplink-downlink configuration change period; or
   sending, by the access device, the first message to the UE not at the start of the uplink-downlink configuration change period, wherein an uplink-downlink configuration indicated by the uplink-downlink configuration indication is enabled within a uplink-downlink configuration change period following the uplink-downlink configuration change period.

4. The method according to claim 1, wherein:
the uplink-downlink configuration indication is used to indicate an uplink-downlink configuration number.

5. A method for configuring a transmission resource, the method comprising:
obtaining, by a user equipment (UE), an uplink-downlink configuration change period based on a notification received from an access device, wherein the uplink-downlink configuration change period is less than a system message change period, wherein the system message change period is a change period of a System Information Block-1 message;
receiving, by the UE, a first message from the access device, wherein the first message carries an uplink-downlink configuration indication corresponding to the uplink-downlink configuration change period; and
updating, by the UE and according to the uplink-downlink configuration indication carried in the first message, an uplink-downlink configuration used by the UE, wherein the uplink-downlink configuration defines which one or more subframes are downlink subframes, which one or more subframes are uplink subframes, and which one or more subframes are special subframes in a time division duplex system,
wherein the uplink-downlink configuration change period is 1/N of the system message change period, wherein N is a positive integer greater than 1.

6. The method according to claim 5, wherein the receiving, by the UE, the first message from the access device comprises:
receiving, by the UE, the first message from the access device at a start of the uplink-downlink configuration change period, wherein an uplink-downlink configuration indicated by the uplink-downlink configuration indication carried in the first message is enabled within the uplink-downlink configuration change period.

7. The method according to claim 5, wherein after the updating the uplink-downlink configuration used by the UE, the method further comprises:
receiving, by the UE, a system message from the access device, wherein the system message carries an uplink-downlink configuration indication corresponding to the system message change period; and
updating, by the UE and according to the uplink-downlink configuration indication carried in the system message, the uplink-downlink configuration used by the UE.

8. A user equipment (UE), comprising:
a processor, configured to obtain a uplink-downlink configuration change period based on a notification received from an access device, wherein the uplink-downlink configuration change period is less than a system message change period, wherein the system message change period is a change period of a System Information Block-1 message; and
a receiver, configured to receive a first message from the access device, wherein the first message carries an uplink-downlink configuration indication corresponding to the uplink-downlink configuration change period;
wherein the processor is further configured to update, according to the uplink-downlink configuration indication carried in the first message, an uplink-downlink configuration used by the UE, wherein the uplink-downlink configuration defines which one or more subframes are downlink subframes, which one or more subframes are uplink subframes, and which one or more subframes are special subframes in a time division duplex system,
wherein the uplink-downlink configuration change period is 1/N of the system message change period, wherein N is a positive integer greater than 1.

9. The UE according to claim 8, wherein the receiver is further configured to:
receive the first message from the access device at a start of the uplink-downlink configuration change period, wherein an uplink-downlink configuration indicated by the uplink-downlink configuration indication carried in the first message is enabled within the uplink-downlink configuration change period.

10. The UE according to claim 8,
wherein the receiver is further configured to receive a system message from the access device after the processor updates the uplink-downlink configuration used by the UE, wherein the system message carries an uplink-downlink configuration indication corresponding to the system message change period; and
wherein the processor is further configured to update, according to the uplink-downlink configuration indication carried in the system message received by the receiver, the uplink-downlink configuration used by the UE.

11. A non-transitory computer readable storage medium storing computer program code that, when executed by a processing unit, causes the processing unit to perform the steps of:
notifying, by an access device, a user equipment (UE) of an uplink-downlink configuration change period, wherein the uplink-downlink configuration change period is less than a system message change period, wherein the system message change period is a change period of a System Information Block-1 message; and
sending, by the access device, a first message to the UE, wherein the first message carries an uplink-downlink configuration indication corresponding to the uplink-downlink configuration change period, so that the UE updates, according to the uplink-downlink configuration indication, an uplink-downlink configuration used by the UE, wherein the uplink-downlink configuration defines which one or more subframes are downlink subframes, which one or more subframes are uplink subframes, and which one or more subframes are special subframes in a time division duplex system,
wherein the uplink-downlink configuration change period is 1/N of the system message change period, wherein N is a positive integer greater than 1.

12. The computer readable storage medium according to claim 11, wherein the notifying, by an access device, the UE of the uplink-downlink configuration change period comprises:
notifying, by the access device, the UE of the uplink-downlink configuration change period by using a system broadcast message; or
notifying, by the access device, the UE of the uplink-downlink configuration change period by using dedicated radio resource control signaling.

13. The computer readable storage medium according to claim 11, wherein the sending, by the access device, the first message to the UE comprises:
sending, by the access device, the first message to the UE at a start of the uplink-downlink configuration change period, wherein an uplink-downlink configuration indicated by the uplink-downlink configuration indication carried in the first message is enabled within the uplink-downlink configuration change period; or sending, by the access device, the first message to the UE not at the start of the uplink-downlink configuration change period, wherein an uplink-downlink configuration indicated by the uplink-downlink configuration indication is enabled within a uplink-downlink configuration change period following the uplink-downlink configuration change period.

14. The computer readable storage medium according to claim 11, wherein:
the uplink-downlink configuration indication is used to indicate an uplink-downlink configuration number.

* * * * *